United States Patent Office 3,769,312
Patented Oct. 30, 1973

3,769,312
PROCESS FOR THE PREPARATION OF POLYHALOORGANO HYPOCHLORITES
Douglas Eugene Gould, Boonton, Lowell Ray Anderson, Parsippany, and William Burke Fox, Morristown, N.J., assignors to Allied Chemical Corporation, New York, N.Y.
No Drawing. Filed June 5, 1968, Ser. No. 734,515
Int. Cl. C07c 71/00
U.S. Cl. 260—453 R      5 Claims

ABSTRACT OF THE DISCLOSURE

Polyhaloorgano hypochlorites of the formula:

$$R-(OCl)_n$$

wherein $n$ is 1 or 2, R is an open chain YZ—perhaloalkyl group when $n$ is 1 and an open chain YZ—perhaloalkylene group when $n$ is 2, wherein Y and Z are substituents on the R moiety and may be the same or different and selected from electronegative groups unreactive to the —OCl group or groups, with the proviso that when $n$ is 2 the R group contains at least three carbon atoms, and in such a case the carbon atom or atoms attached to the —OCl group or groups are each bonded to no more than two other carbon atoms; may be prepared by reacting certain compounds containing carbon-oxygen bonds with an inorganic reagent containing a chlorine atom in a plus 1 oxidation state which chlorine atom is attached to a more electronegative element. These novel polyhaloorgano hypochlorites are useful as polymerization initiators and are valuable intermediates for the synthesis of other useful compounds.

BACKGROUND OF THE INVENTION

A variety of organo hypohalites are known in the prior art. For example, alkyl hypohalites including alkyl hypochlorites are disclosed in U.S. Pat. 1,938,175. Tertiary cycloaliphatic hypohalites are disclosed in U.S. Pat. 2,675,402. Tertiary butyl hypochlorite is disclosed in U.S. Pat. 3,149,140. Trifluoromethyl hypofluorite is disclosed in U.S. Pat. 2,689,254. A class of perfluoroalkyl hypofluorites is disclosed by John K. Ruff et al., JACS, 88:19, Oct. 5, 1966, pp. 4531–4532.

SUMMARY OF THE INVENTION

We have discovered a novel class of polyfluoroorgano hypohalites possessing unusual properties not possessed by the most closely related organo hypohalites known to the prior art. These novel compounds are polyhalo hypochlorites of the formula:

$$R-(OCl)_n \quad (I)$$

wherein $n$ is 1 or 2, R is an open chain YZ—perhaloalkyl group when $n$ is 1 and an open chain YZ—perhaloalkylene group when $n$ is 2, Y and Z are substituents on the R moiety and may be the same or different and selected from electronegative groups unreactive to the —OCl group or groups, with the proviso that when $n$ is 2 the R group contains at least three carbon atoms and that the carbon atom or atoms attached to the —OCl group or groups are each bonded to no more than two other carbon atoms. These compounds are useful as sources of active chlorine which can be taken advantage of in bleaches and as chlorinating agents capable of chlorinating unsaturated bonds in organic compounds and to replace hydrogen atoms in organic molecules. Fumes of the novel hypochlorites are toxic to insects and other animal life.

The novel hypochlorites possess a number of unexpected and unusual properties as compared with the closest related prior art compounds, the corresponding hypofluorites.

For example, at temperatures between —20° C. and room temperature the novel hypochlorites react readily with carbon monoxide to yield the corresponding chloroformates of the formula:

$$R-\left(O\overset{O}{\underset{\|}{C}}Cl\right)_n$$

wherein R and $n$ are as defined above. These chloroformates are useful as catalysts for the polymerization of unsaturated compounds and in the preparation of polycarbonates, polyesters and formaldehyde polymers. When it is attempted to react the corresponding hypofluorites under similar conditions, either no reaction takes place or different products are obtained.

By way of further example, at room temperature the novel hypochlorites react with ECN, wherein E is an electronegative group, to form $CF_2ENCl_2$. For example, the novel hypochlorites react with ClCN (cyanogen chloride) to form $CF_2ClNCl_2$. This compound is useful as an initiator for the polymerization of fluoroolefins and as a fumigant and rodent killer. When it is attempted to react the corresponding hypofluorites under similar conditions, essentially no reaction takes place. After a long reaction period small traces of $COF_2$ can be detected but no detectable amounts of the corresponding difluoro-substituted $CF_2ClNF_2$ can be observed.

It has been discovered that the novel hypochlorites may be prepared by reacting a starting compound containing at least four atoms including one or two carbonyl groups $$\left(\underset{|}{\overset{|}{C}}=O\right)$$

associated other than in an aldehyde linkage, in which the non-carbonylic portion or portions of the molecule comprise open chain YZ—perhaloalkyl groups, or open chain YZ—perhaloalkylene groups, wherein Y and Z are substituents on the perhaloalkyl or perhaloalkylene groups and may be the same or different and selected from halogen atoms or electronegative groups unreactive to —OCl groups, with an inorganic chlorinating reagent containing a chlorine atom in a plus 1 oxidation state, which chlorine atom is attached to a more electronegative element in the presence of a catalyst comprising a metal fluoride selected from the group consisting of LiF, NaF, KF, RbF and CsF. Thus the preferred starting compounds are of the following formulae:

$$R'-\overset{O}{\underset{\|}{C}}-R' \quad \text{or} \quad F-\overset{O}{\underset{\|}{C}}-X-\overset{O}{\underset{\|}{C}}-F$$

Wherein R' is fluorine or a perhaloalkyl group containing the same or different fluorine or chlorine atoms and X is a perhaloalkylene group containing the same or different fluorine or chlorine atoms.

Still another way of making the novel hypochlorites of the invention is by reacting a subject inorganic chlorinating agent with compounds of the formula $R-(OM)_n$ wherein R and $n$ are as defined above and the M atoms may be the same or different and selected from the group consisting of Li, Na, K, Rb, Cs and H, with the proviso that if M is H, the carbon atom which is attached to the resulting OH group is not further substituted with halogen. In this embodiment, a catalyst is not required but can be used if desired to increase efficiency. Suitable catalysts include the metal fluorides described above.

DETAILED DESCRIPTION AND THE PREFERRED EMBODIMENTS

With reference to Formula I above, the open chain R groups may be straight chain or branched chain YZ—perhaloalkyl or YZ—perhaloalkylene groups. The Y and Z substituents may be the same or different electronegative groups which are unreactive to the —OCl groups in the molecule. Examples of such electronegative groups are as follows: $FSO_2$, $FSO_3$, $NO_2$, halogen, perfluoroalkyl, perfluorocycloalkyl and perfluoroaryl. This is not a critical portion of the molecule and those of ordinary skill in the art will readily be able to conceive of and incorporate other electronegative groups which can serve as Y and Z substituents. Preferably Y and Z are both halogen atoms, particularly fluorine.

A preferred class of compounds within the scope of the invention are those which contain a minimum number of fluorine atoms which is at least equal to one half the total number of halogen atoms and electronegative groups present in the molecule.

Subject to the indicated proviso in the definition of these compounds, the preferred number of carbon atoms in the R group is from 1–15. Compounds in which the R group contains more than 15 carbon atoms may be prepared, however, and exhibit the same properties.

As can be seen from Formula I, when $n$ is 1 a class of polyhaloorgano hypochlorites is defined. When $n$ is 2 a corresponding class of polyhaloorgano dihypochlorites is formed. When $n$ is 1 the R group preferably contains from 1–6 carbon atoms and still preferably from 1–3 carbon atoms. When $n$ is 2 the R group preferably contains from 3–6 carbon atoms and still preferably from 3–5 carbon atoms.

Preferably all halogen atoms in the molecule are selected from F and Cl and still preferably, all the halogen atoms in the molecule are F.

Illustrative compounds within the scope of the invention are as follows:

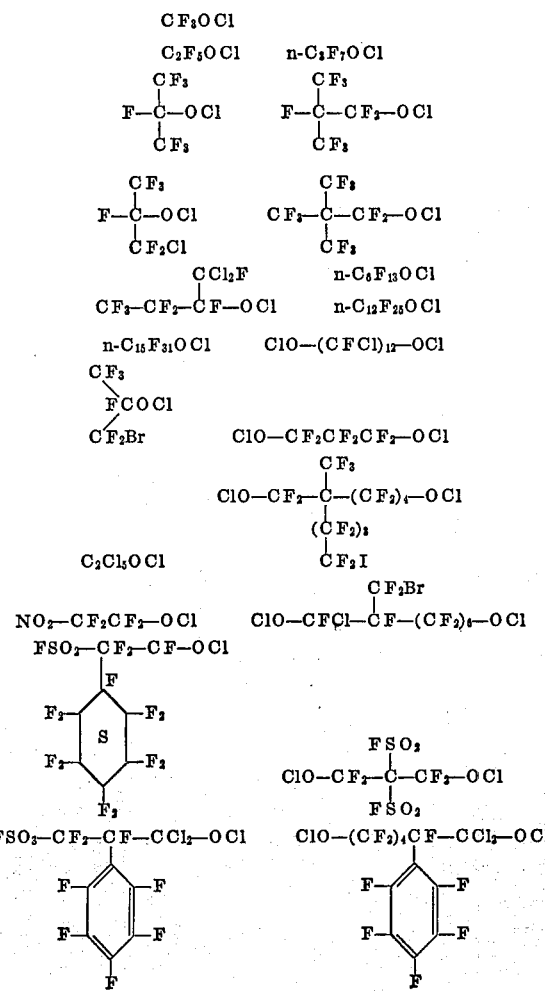

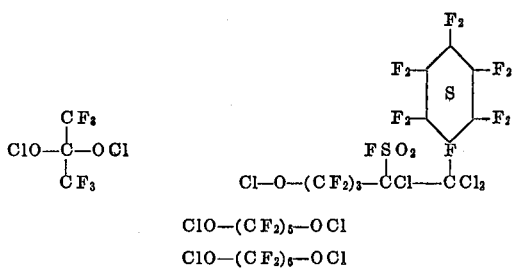

$$ClO-(CF_2)_5-OCl$$
$$ClO-(CF_2)_6-OCl$$

As indicated in the description of the invention process above, suitable starting compounds are those having at least 4 atoms including a carbonyl group, other than aldehyde, in its molecular structure. The non-carbonylic portions of the molecules of the starting compounds therefore include the R structure desired and may be substituted with up to two electronegative groups and are otherwise perhalogenated in accordance with the definitions given herein. Monofunctional starting compounds produce the monohypochlorites. The corresponding dihypochlorites can be produced from difunctional carbonylic compounds such as diacids and diketones. In some cases monohypochlorites can be produced optionally from difunctional compounds under conditions which cause molecular rearrangement. It can be seen therefore that suitable starting compounds include such materials as $COF_2$, acids, acid halides and ketones. An illustration of the latter class of starting materials is hexafluoroacetone.

Salts of these carbonyl compounds may be employed as starting compounds. These salts have the formula:

$$R—(OM)_n$$

wherein R and $n$ are as defined above and M may be the same or different and is a member selected from the group consisting of Li, Na, K, Rb or Cs. These salts may readily be prepared by heating the carbonyl compound with a metal fluoride of the formula MF whereas M is as defined above. Low yields of these salts are obtained even at very low temperatures, however, it has been found that excellent yields of the salts are obtained when the reactants are heated in a closed reactor to 100° C. and the reaction is allowed to proceed under the autogenous pressure developed in the reactor at that temperature. Preferably, the reactor is agitated or shaken during the reaction and a large excess of the carbonyl starting compound, say in the order of 2–5 fold is employed. The salts are solids and are best recovered by providing a large enough excess of the carbonyl starting compound to ensure complete reaction and pumping off the unreacted carbonyl starting compound. Reaction mixtures in which incomplete conversion to the salts is effected, in other words wherein residual quantities of the MF are present, may still readily be used as starting materials for the main reaction. The excess of MF material present will then serve as catalyst for the reaction.

The chlorinating reagent which is reacted with the starting compound is an inorganic reagent which contains a chlorine atom in a +1 oxidation state which chlorine atom is attached to a more electronegative element. Illustrative suitable chlorinating agents are ClF, $Cl_2O$, $ClONO_2$, NaOCl and $ClOSO_2F$. The preferred reagents are ClF and $Cl_2O$. Still other suitable inorganic chlorinating agents will readily occur to those skilled in the art.

It should be noted that in some cases the carbonylic starting materials can react with the catalyst to effect replacement of halogen or other substituent with fluorine and that accordingly the final hypochlorite product may not correspond precisely to the starting material employed. For example the acid chlorides will react with CsF to produce two types of products as illustrated by the following equations:

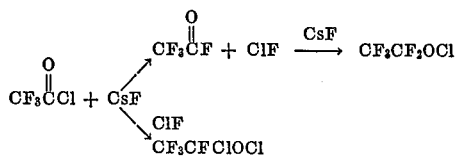

Reaction temperatures vary over a very wide range. Generally, the reaction proceeds readily even at very low temperatures. For example, reaction with ClF will take place readily at −78° C. The reaction will proceed at temperatures up to 25° C. and higher but in view of the ready reaction at lower temperatures there is no advantage in supplying heat to the reaction. Preferred temperatures range from about −78° C. to 0° C. and most preferably in the order of about −20° C. Depending on the particular reagent employed and the starting compound chosen, the optimum reaction temperature may vary within the above indicated ranges. Accordingly, the optimum temperature range for a particular reaction can be determined routinely.

Atmospheric, sub- or super-atmospheric pressures may be successfully employed in the practice of the invention process.

The reaction can be carried out with the reactants in liquid, vapor or solid phase. In the latter case any inert solvent is preferably employed, such as, for example, a halogenated hydrocarbon such as $CFCl_3$. The catalysts are used in solid phase.

The stoichiometry of the reaction to produce mono-hypochlorites requires one mol of inorganic chlorinating reagent per mol of starting compound. In the case of bi-hypochlorites, two mols of reagent per mol of starting compound are required. In order to ensure complete reaction therefore at least the stoichiometric amount or a slight excess of reagent should be employed. There is no advantage in employing large stoichiometric excesses of the reagents although large excesses of the same will not deleteriously affect the reaction.

The catalysts employed comprise a metal fluoride in which the metal is selected from the group consisting of Li, Na, K, Rb and Cs. The preferred catalysts are CsF, RbF, and KF, particularly CsF. The amount of catalyst employed is not critical. Very small amounts will serve to catalyze the reaction and very large amounts will not deleteriously affect the reaction. Generally, about .1–3 mols catalyst/mol of the organic starting compound is employed with a preferred ratio being between about .5–1 mol catalyst/mol of organic starting compound.

The reaction of the $R-(OM)_n$ compounds with the disclosed inorganic chlorinating reagents proceeds under the same conditions as disclosed for the reaction of the carbonyl containing starting compounds, except that no catalyst need be employed. The same catalysts described above may optionally be employed and will improve results. This process is particularly useful for preparing di-hypochlorites within the scope of the invention wherein both hypochlorite functions are attached to the same carbon atom. Illustrative reactions of this type include the following:

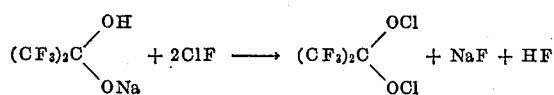

and

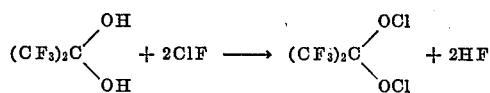

This reaction proceeds without a catalyst under the same conditions described for the reaction involving the carbonylic starting compounds.

Materials of construction for the apparatus used for the subject reactions should be inert to the reactants employed. Stainless steel and fluoropolymers, e.g. polytetrafluoroethylene and polychlorotrifluoroethylene are illustrations of suitable types of materials for this purpose.

The following examples are intended to be illustrative of the invention and are not intended to constitute a limitation on the scope thereof. Parts and percentages are by weight unless otherwise indicated.

EXAMPLE 1

A 30 ml. stainless steel Hoke cylinder was charged with 2 grams of dry finely ground CsF. The cylinder was then fitted with a stainless steel Hoke needle valve. Conventional vacuum techniques using a metal (nickel-Monel)-"Plaskon" (TM of Allied Chemical Corp. for a polymer of chlorotrifluoroethylene) type fluoropolymer system were used to condense 10 mmol of $COF_2$ and 10 mmol of ClF into the cylinder at about −196° C. The mixture was allowed to warm to −20° C. and was stored overnight at that temperature. A number of runs were combined and fractionated between traps maintained at −140° C. and −196° C. The product under normal conditions was an essentially colorless gas, B.P. −47° C., M.P. −164° C. and was identified as being $CF_3OCl$.

*Analysis.*—Calculated for $CF_3OCl$ (percent): C, 9.36; F, 47.30; Cl, 29.46. Found (percent): C, 9.92; F, 44.70; Cl, 29.23.

A vapor density determination of the molecular weight of the product gave a value of 120.7 g./mol which is in excellent agreement with the calculated value for $CF_3OCl$ of 120.5 g./mol. Infrared and nuclear magnetic resonance spectra analyses produced results which were consistent with the structure of $CF_3OCl$. The yield of the $CF_3OCl$ produced was essentially quantitative.

EXAMPLE 2

A 30 ml. stainless steel Hoke cylinder was charged with 3 grams of dry, finely ground CsF. The cylinder was then fitted with a stainless steel Hoke needle valve. Conventional vacuum techniques using a metal-"Plaskon" type system as described in Example 1 were used to condense 2 mmol of $COF_2$ and 2 mmol of $Cl_2O$ onto the CsF. The reaction vessel was then stored overnight at −25° C. The gaseous product had a B.P. of −47° C. It was identical in all respects with that of the $CF_3OCl$ material prepared in accordance with Example 1. The yield was 50%.

EXAMPLE 3

The procedure of Example 2 was repeated excepting that 10 mmol of $CF_3C(O)F$ and 10 mmol of ClF were condensed onto 5 mmol of the CsF. As in Example 1, a number of runs were made and the products of the runs were combined and fractionated between cold traps. These traps were maintained between −111° C. and −196° C. The product obtained under normal conditions was an essentially colorless gas and was identified as being

*Analysis.*—Calculated for $C_2F_5OCl$ (percent): C, 14.08; F, 53.88; Cl, 20.82. Found (percent): C, 14.52; F, 55.72; Cl, 20.44.

A vapor density determination of the molecular weight of the product gave a value of 170.9 g./mol which is in excellent agreement with the calculated value for $C_2F_5OCl$ of 170.5 g./mol. Infrared and nuclear magnetic resonance spectra analyses produced results which were consistent with the structure of $C_2F_5OCl$.

EXAMPLE 4

The procedure of Example 2 was repeated excepting that 3 mmol of $(CF_3)_2C=O$ and 3 mmol of ClF were condensed onto 2 g. of the CsF. Fractionation of accumulated product was carried out between −95° C. and =196° C. traps. The product was collected in the —95° C. trap and under normal conditions was an essentially colorless gas boiling at 22° C. The product was identified as being

*Analysis.*—Calculated for $C_3F_7OCl$ (percent): C, 16.33; F, 60.32; Cl, 16.10. Found (percent): C, 16.40; F, 58.88; Cl, 16.35.

A vapor density determination of the molecular weight of the product gave a value of 220.4 g./mol which is in excellent agreement with the calculated value of 220.5 g./mol. Infrared and nuclear magnetic resonance spectra analyses produced results which were consistent with the above indicated structure. The yield of product was 95%.

EXAMPLE 5

The procedure of Example 2 was repeated excepting that 3 mmol of

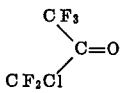

and 3 mmol of ClF were condensed onto a small amount (not weighed) of the CsF. Overnight storage was effected at —20° C. and accumulated quantities of the product were fractionated between traps maintained at —78° C. and —196° C. The product was collected in the —78° C. trap and under normal conditions was a slightly yellow liquid. The product was identified as being

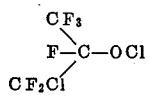

*Analysis.*—Calculated for $C_3F_6Cl_2O$: Cl, 29.96%. Found: Cl, 29.14%.

Infrared and nuclear magnetic resonance spectra analyses produced results which were consistent with the above indicated structure. The yield of the product was 95%.

EXAMPLE 6

14.5 mmol of $COF_2$ was added to an unknown but deficient amount of CsF and the mixture was heated at about 100° C. for about 24 hours. The mixture was allowed to cool and there was obtained 1.5 mmol of the following salt $CF_3O—Cs^+$. A slight excess of ClF was added to this salt and the mixture was cooled to —20° C. and maintained at that temperature for a period of 20 hours. At the end of this period the resulting mixture was fractionated between traps maintained at —140° C. and —196° C. About 0.85 mmol of essentially pure $CF_3OCl$ was collected in the —140° C. trap. The infrared spectrum of this product corresponds to the infrared spectrum of the $CF_3OCl$ product obtained in Example 1.

EXAMPLE 7

A 50 ml. "Plaskon" type reactor fitted with a Whitey Nupro "Teflon" valve was charged with a small quantity (unweighed) of CsF. Conventional vacuum techniques using a metal-"Plaskon" type system were used to condense 2 mmol of perfluoroglutaryl fluoride

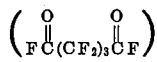

and 4 mmol of ClF onto the CsF. After overnight storage a pale yellow liquid, boiling at about 150° C. was observed in the reactor which exhibited no vapor pressure at 0° C. The liquid product was removed from the CsF by pouring through a "Teflon T" system into another "Plaskon" type tube. Samples of the product from a number of runs were collected and consolidated. The consolidated product was purified by pumping away volatile impurities at 0° C. The product was identified as being $ClO(CF_2)_5OCl$.

EXAMPLE 8

(A) Reaction of $CF_3OCl$ with CO. $CF_3OCl$ was reacted with CO in about a 1:1 molar ratio at —20° C. Reaction took place readily to yield the corresponding chloroformate $CF_3OCOCl$, a colorless liquid, B.P. 0° C. Identity of the product was confirmed by elemental, infrared and nuclear magnetic resonance spectra analyses.

(B) Attempted reaction of $CF_3OF$ with CO. Attempts to react $CF_3OF$ with CO under the same conditions described in part A were negative. The reaction temperature was raised to 25° C. and still no reaction took place.

EXAMPLE 9

The reactions or attempted reactions of Example 8A and B were made with $C_2F_5OCl$ and $C_2F_5OF$, respectively. With $C_2F_5OCl$, the corresponding chloroformate, $C_2F_5OC(O)Cl$, a colorless gas, B.P. 28° C. was produced, as confirmed by elemental, infrared and nuclear magnetic resonance analyses. With $C_2F_5OF$, no reaction took place at —20° C., however a reaction took place at 25° C. to form the corresponding acid fluoride, $CF_3C(O)F$, and $COF_2$ rather than the corresponding $C_2F_5OC(O)F$ product. The identity of these products was confirmed by infrared analysis.

EXAMPLE 10

(A) Reaction of $CF_3OCl$ with ClCN. About 10 mmol of $CF_3OCl$ and about 10 mmol of ClCN were condensed together in a 225 cc. stainless steel reactor equipped with a "Hoke" needle valve. The mixture was then allowed to warm to room temperature and permitted to stand for several days. At the end of this period, it was observed that a reaction had taken place and the products were analyzed by elemental analysis, molecular weight determination, infrared and nuclear magnetic resonance spectra analyses. The identities of the reaction products were ascertained to be $CF_2ClNCl_2$ and $COF_2$.

(B) It was attempted to react $CF_3OF$ and ClCN under the same conditions described in part A. After the reaction period, no change in the starting material was observed and there was no evidence supporting the formation of the analogous $CF_2ClNF_2$ material.

The above examples are not intended to limit the scope of the invention which is defined by the following claims.

We claim:

1. The process for preparing polyhaloorgano hypochlorites of the formula $R—(OCl)_n$ wherein $n$ is 1 or 2, R contains from 1–15 carbon atoms and is an open chain perhaloalkyl group when $n$ is 1 and an open chain perhaloalkylene group when $n$ is 2, said halogens being fluorine or chlorine with the provisos that when $n$ is 2 the R group contains at least three carbon atoms and that the carbon atom or atoms attached to the OCl group or groups are each bonded to no more than two other carbon atoms, comprising reacting a starting compound of the following formulae:

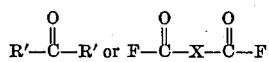

wherein R' is fluorine or perhaloalkyl as defined above and X is perhaloalkylene as defined above, with an inorganic chlorinating reagent containing a chlorine atom in the +1 oxidation state which chlorine atom is attached to a more electronegative element, in the presence of a catalyst comprising a metal fluoride selected from the group consisting of LiF, NaF, KF, RbF and CsF.

2. The process according to claim 1 wherein the reagent is ClF.

3. The process according to claim 1 wherein the reagent is $Cl_2O$.

4. The process according to claim 1 in which the starting compound is $COF_2$.

5. The process according to claim 1 in which the starting compound is hexafluoroacetone.

(References on following page)

References Cited

UNITED STATES PATENTS

| | | | |
|---|---|---|---|
| 2,884,453 | 4/1959 | Tullock | 260—543 |
| 3,253,046 | 5/1966 | Teumac et al. | 260—651 |

FOREIGN PATENTS

| | | | |
|---|---|---|---|
| 560,219 | 7/1958 | Canada | 260—453 |

OTHER REFERENCES

Prager et al. "Prep. and Char. of New Fluoroxy Cmpds.," (1965) J.A.C.S. 87, pp. 230–38 (1965).

Mayer et al., "Computation of High Temp. Rate etc.," (1966), CA 69, p. 537 (1968).

Simons, J. H., "Fluorine Chemistry," New York Academic Press Inc., (1950), pp. 10, 63 and 64, vol. 1, QD181FI S48.

Redwood et al., "Fully Fluorinated Alkoxides," Can. J. Chem. 43, pp. 1893–98 (1965).

Gall, "Recent Advances in Fluorine Chem.," (1959), Am. Rocket Soc. 29, pp. 95–103.

Ruff et al., "A Simple Syn. of Fluoroxyperfluoroalkyl Cmpds.," (1966), J.A.C.S. 88, pp. 4531–32.

Lowy et al., "Sulfur, Phosphono, etc.," An Introduction to Org. Chem., 6th Ed., p. 213, Wiley & Sons (1945).

Brown, "Electronegativity, Non-Bonded Interactions and Polarizability in the Hydrogen Halides and the Interhalogen Cmpds.," (1961), J.A.C.S. 83, pp. 36–42 (1961).

LEWIS GOTTS, Primary Examiner

G. HOLLRAH, Assistant Examiner

U.S. Cl. X.R.

8—109; 260—95 R, 463, 583 NH; 424—149, 325